United States Patent [19]

Maier

[11] Patent Number: 5,593,232
[45] Date of Patent: Jan. 14, 1997

[54] INTEGRAL PIVOT PAD BUSHING SEAL BEARING

[75] Inventor: Martin D. Maier, Olean, N.Y.

[73] Assignee: Dresser-Rand Company, Corning, N.Y.

[21] Appl. No.: 562,037

[22] Filed: Nov. 22, 1995

[51] Int. Cl.⁶ .................................................. F16C 32/06
[52] U.S. Cl. .......................... 384/119; 384/117; 384/309
[58] Field of Search .................................. 384/114, 117, 384/119, 306–312

[56] References Cited

U.S. PATENT DOCUMENTS

| | | | |
|---|---|---|---|
| 1,880,353 | 10/1932 | Michell | 384/309 |
| 2,137,487 | 11/1938 | Hall | 384/307 |
| 2,498,011 | 2/1950 | Sherbondy | 384/311 |
| 3,439,924 | 7/1966 | Ludewig et al. | 277/137 |
| 3,472,566 | 10/1969 | Kunderman | 384/312 |
| 3,756,673 | 9/1973 | Strub | 384/117 |
| 3,912,342 | 10/1975 | Schirm et al. | 384/131 |
| 3,930,691 | 1/1976 | Greene | 384/307 X |
| 3,944,304 | 3/1976 | Purtschert | 384/117 |
| 4,133,541 | 1/1979 | Kirk | 277/65 |
| 4,403,873 | 9/1983 | Gardner | 384/306 |
| 4,460,283 | 7/1984 | Yoshioka et al. | 384/119 |
| 4,544,285 | 10/1985 | Shapiro et al. | 384/99 |
| 4,552,368 | 11/1985 | Wallace | 277/27 |
| 4,639,146 | 1/1987 | Yoshioka et al. | 384/99 |
| 4,660,838 | 4/1987 | Katayama et al. | 277/97 |
| 4,738,550 | 4/1988 | Gardner | 384/306 |
| 4,927,275 | 5/1990 | Lawson | 384/117 |

OTHER PUBLICATIONS

Tech Facts TF7–00, "Tilt Pad Oil Film Seal", by Dresser. No Date.

*Primary Examiner*—Thomas R. Hannon
*Attorney, Agent, or Firm*—Richards, Medlock & Andrews

[57] ABSTRACT

An integral pivot pad bushing seal bearing, adapted for sealing about a rotating shaft, includes a carrier ring having a radially inner generally cylindrical surface for providing a fluid seal about the shaft. A plurality of cavities are formed in the carrier ring so as to open in the radially inner generally cylindrical surface. Each cavity contains a pivot pad having a radially inner generally cylindrical pad surface which is substantially flush with the radially inner generally cylindrical surface of the carrier ring. The carrier ring and the pivot pads are contained in the same axial length as a unitary structure and act together to both seal and support the shaft. Each cavity can have a longitudinally extending groove in its radially outermost portion for receiving high pressure fluid to press each pivot pad inwardly toward the shaft. A second groove, in communication with the first groove, can be formed in a cavity end wall to apply high pressure to an axial face of the pivot pad. Each of a plurality of fluid passageways extend from an exterior surface, which is exposed to high pressure, of the carrier ring to a radially outer portion of a respective cavity so that high pressure fluid is supplied to the gap between the pivot pad and the arcuate cavity wall to act against the radially outermost portion of the outer arcuate pad surface to provide positive lubrication between the contact surfaces and to press the respective pivot pad toward the shaft.

28 Claims, 2 Drawing Sheets

INTEGRAL PIVOT PAD BUSHING SEAL BEARING

TECHNICAL FIELD OF THE INVENTION

The present invention relates to a compact combination of a tilt pad bearing and a bushing seal.

BACKGROUND OF THE INVENTION

A bushing seal and a tilt pad bearing are often used together. One such conventional combination comprises a bushing seal and a tilt pad bearing positioned about a rotating shaft, with the bushing seal being axially spaced from the tilt pad bearing. The bushing seal has an inner cylindrical surface which provides an annular seal for the external surface of the shaft against a differential fluid pressure existing in a direction parallel to the shaft axis. The tilt pad bearing comprises an array of tilting pad shoes which are mounted at spaced apart locations around the inside surface of a carrier ring positioned axially adjacent to the bushing seal. The bushing seal can be a fixed bushing seal or a floating bushing seal. A hydrodynamic fluid film, generated between the tilt pads and the rotating shaft, imparts direct stiffness and damping to the shaft system. As there are substantial gaps between adjacent tilt pads in a circumferential direction, the fluid pressure is the same at both axial ends of the tilt pad bearing. Although these tilt pads do not provide any sealing against differential fluid pressure, these tilt pads do provide a rotor dynamic benefit, particularly by improving rotor stability. However, such arrangement of the tilt pad bearing and the bushing seal requires significant axial space because the bushing seal requires a certain axial extent and the tilt pad bearing adjacent thereto requires a certain additional axial extent. In general, this conventional combination requires the axial space normally occupied by two standard bushing seals. Such an arrangement also renders maintenance and replacement of the bushing seal and the tilt pads cumbersome. A need exists for a combination bushing seal and tilt pad bearing arrangement that requires less axial space, yet achieves the benefits of such a combination. In particular, a need exists for a combination bushing seal and tilt pad bearing arrangement which is compact enough to be installed as a replacement for a standard bushing seal in a unit which will accommodate only one standard bushing seal.

SUMMARY OF THE INVENTION

The present invention provides an integral pivot pad bushing seal bearing adapted for sealing and damping a rotating shaft. The bushing seal bearing comprises a carrier ring which has a central longitudinal axis coaxial with that of the rotatable shaft, a radially inner generally cylindrical surface, a radially outer surface, a first annular end wall and a second annular end wall. The radius of the radially inner generally cylindrical surface is only slightly greater than the radius of the adjacent portion of the rotatable shaft, so that the carrier ring serves as a bushing seal to provide a fluid film sealing clearance between the shaft and the carrier ring. A plurality of cavities are formed in the carrier ring so as to provide openings in the radially inner generally cylindrical surface at equally spaced apart intervals. Each cavity has an arcuate cavity wall and first and second cavity end walls. Disposed in each cavity is a pivot pad that has a radially outer arcuate pad surface substantially conforming to the arcuate cavity wall, first and second pad end walls, and a radially inner generally cylindrical pad surface substantially conforming to the external surface of the rotatable shaft, but with the dimensions of the pivot pads being only slightly smaller than the corresponding dimensions of the associated cavity such that there is a slight clearance between each pivot pad and the walls of its associated cavity to allow pivoting of the pivot pads when the shaft is rotated.

In a presently preferred embodiment, at least one fluid passageway extends from an exterior surface, which is exposed to high pressure, of the carrier ring to a radially outer portion of each cavity so that high pressure fluid is supplied to the gap between the pivot pad and the arcuate cavity wall to act against the radially outermost portion of the outer arcuate pad surface to provide positive lubrication between the contact surfaces and to press the respective pivot pad toward the shaft.

In the presently preferred embodiment, a first groove is formed in a substantially radially outermost portion of each arcuate cavity wall, i.e., at a location which is at a substantially maximum radius from the central longitudinal axis of the shaft, and a second groove is formed in each first cavity end wall, with each second groove being in fluid communication with the first groove of the respective cavity. At least one fluid passageway extends from an exterior surface of the carrier ring to each first groove so that high pressure fluid is supplied to the first and second grooves to act against the radially outermost portion of the outer arcuate surface and an end wall of the respective pivot pad.

Additionally, each of the cavities can also open in the surface of the second annular end wall of the carrier ring such that each pivot pad can be slid in an axial direction into the respective cavity. In this embodiment, an annular end cover is attached to the second annular end wall to cover the cavity openings in the second annular end wall surface, thereby maintaining the pivot pads within the cavities.

DETAILED DESCRIPTION

Figure 1:
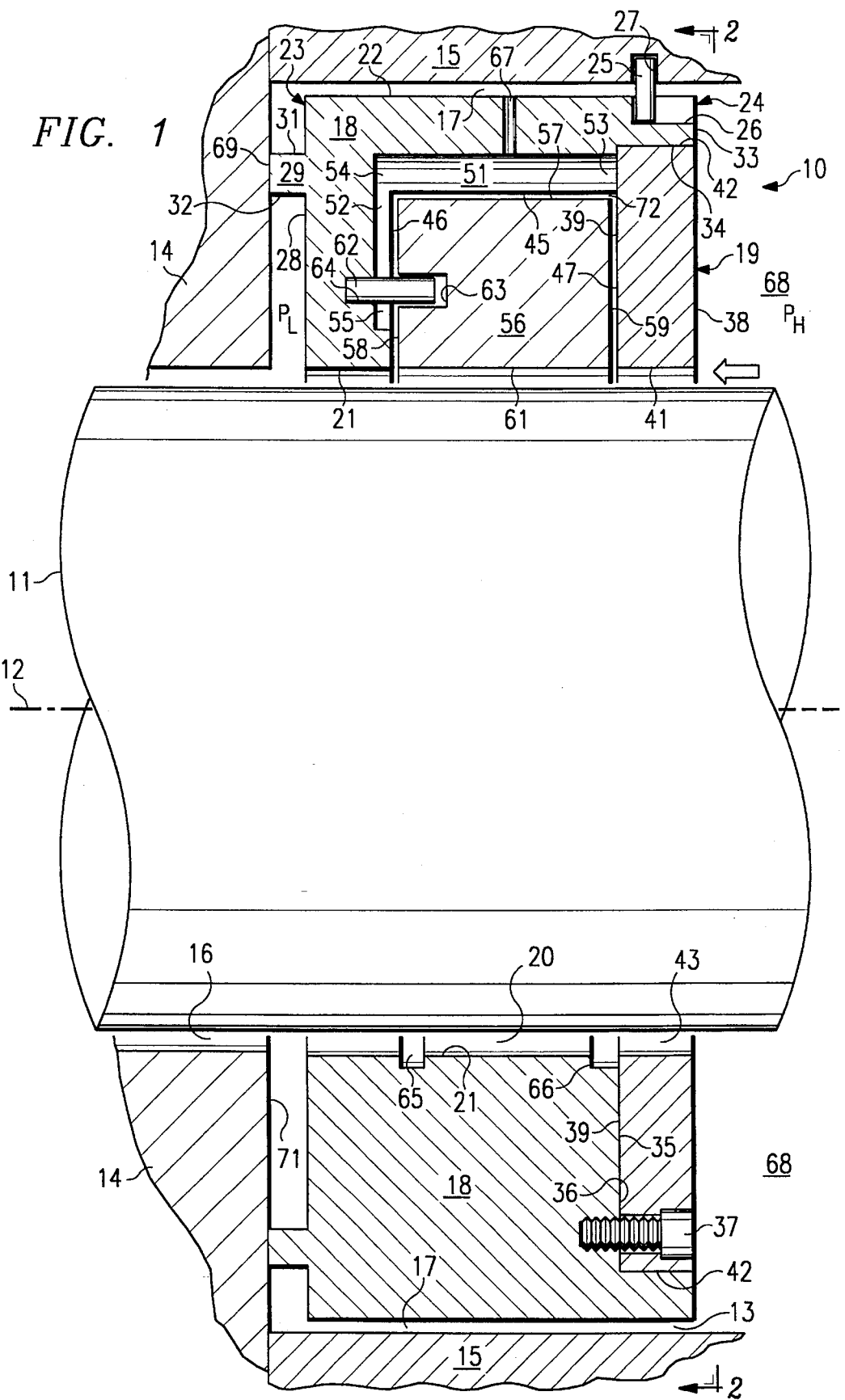
FIG. 1 is a partial cross-sectional view, taken along a plane containing the longitudinal axis of the rotatable shaft, of an integral pivot pad bushing seal bearing, in accordance with the present invention, with the integral pivot pad bushing seal bearing being disposed around the rotatable shaft.
Figure 2:
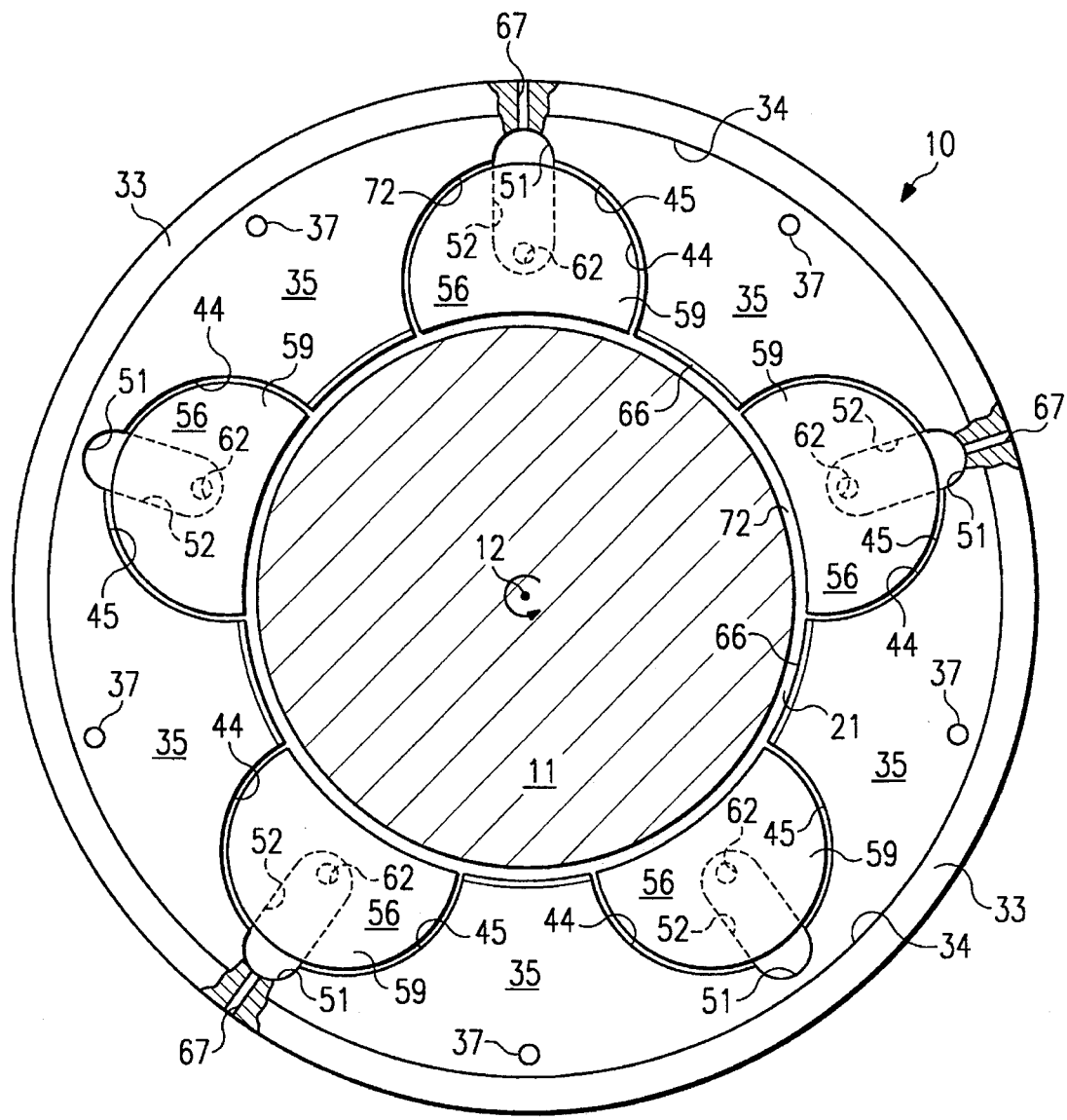
FIG. 2 is an end view, taken along line 2—2 in FIG. 1, of the integral pivot pad bushing seal bearing, omitting the end cover for clarity, with portions of the carrier ring being in cross-section to illustrate the fluid feed passageways.

A presently preferred embodiment of the present invention is explained hereinafter with reference to the accompanying FIGS. 1–2, wherein like reference numerals designate like or corresponding parts to the several views.

The unitary pivot pad bushing seal bearing 10 is shown disposed about and concentric with the rotatable shaft 11, with the longitudinal central axis 12 constituting the longitudinal axis of the unitary pivot pad bushing seal bearing 10 and the longitudinal central axis of the rotatable shaft 11. Unless otherwise stated, radial directions are directions which are radial to the central longitudinal axis 12, and longitudinal directions are parallel to the central longitudinal axis 12. The unitary pivot pad bushing seal bearing 10 is positioned in an annular chamber 13 formed by a first casing component 14 and an axially adjacent second casing component 15, wherein the inner diameter of the first casing component 14 is slightly larger than the diameter of the adjacent portion of the rotatable shaft 11 to form an annular gap 16 therebetween, and the inner diameter of the second casing component 15 is slightly larger than the outer diameter of the unitary pivot pad bushing seal bearing 10 to form an annular gap 17 therebetween. The fluid pressure in the annular gap 16 is low pressure $P_L$, while the fluid pressure in the annular gap 17 is a higher pressure $P_N$.

The unitary pivot pad bushing seal bearing 10 comprises a circumferentially continuous carrier ring 18 and an annular end cover 19. The carrier ring 18 has a radially inner generally cylindrical surface 21 and a radially outer generally cylindrical surface 22. The carrier ring 18 also has a first axial end portion 23 and a second axial end portion 24 which are spaced along the central axis 12. The radius of the radially inner generally cylindrical surface 21 is only slightly greater than the radius of the adjacent portion of the rotatable shaft 11, so that the carrier ring 18 serves as a bushing seal to provide a fluid film sealing clearance 20 between the shaft 11 and the carrier ring 18. In general, the radial clearance 20 between the radially inner generally cylindrical surface 21 and the shaft 11 is substantially less than the radial clearance 16 between the shaft 11 and the casing component 14.

A radially extending dowel 25 has one end in a hole 26 in the outer portion of the carrier ring 18 and the other end in a hole 27 in the inner portion of the second casing component 15 in order to prevent any rotation of the unitary pivot pad bushing seal bearing 10 about the central axis 12. The hole 26 is a longitudinally extending slot, which forms an opening in the annular endwall surface 33 (described infra) and has a width only slightly larger than the diameter of the dowel pin 25 and a longitudinal length substantially greater than the diameter of the dowel pin 25. The slot 26 permits the carrier ring 18 to be inserted axially into the casing component 15 in situations where the casing component 15 is in one piece, i.e., not split.

The first axial end portion 23 comprises a first annular end wall 28 which extends from the radially inner generally cylindrical surface 21 to the radially outer generally cylindrical surface 22 except as interrupted by an annular land element 29 extending longitudinally outwardly from the end wall 28. The annular land element 29 is in the form of an uninterrupted solid ring which is coaxial with the central longitudinal axis 12 and has a radially outer generally cylindrical surface 31 and a radially inner generally cylindrical surface 32. The radius of the radially outer generally cylindrical surface 31 of the land element 29 is less than the radius of the radially outer generally cylindrical surface 22, and the radius of the radially inner generally cylindrical surface 32 of the land element 29 is greater than the radius of the radially inner generally cylindrical surface 21.

The second axial end portion 24 of the carrier ring 18 has a second annular end wall which comprises an outer annular end wall surface 33, an intermediate annular end wall surface 34, and an inner annular end wall surface 35. The intermediate annular end wall surface 34 extends at least generally parallel to the central longitudinal axis 12, at a distance from the central longitudinal axis 12 which is greater than the radius of the radially inner generally cylindrical surface 21 and smaller than the radius of the radially outer generally cylindrical surface 22, from the second axial end portion 24 toward the first axial end portion 23. The outer annular end wall surface 33 extends at least generally radially inwardly from the outer generally cylindrical surface 22 to the axially outer end of the intermediate annular end wall surface 34. The inner annular end wall surface 35 extends at least generally radially inwardly from the axially inner end of the intermediate annular end wall surface 34 to the radially inner generally cylindrical surface 21. Thus, the intermediate annular end wall surface 34 and the inner annular end wall surface 35 form an annular recess 36 in the second axial end portion 24. In the illustrated embodiment, each of the end wall surfaces 33 and 35 is a planar surface which is perpendicular to the central longitudinal axis 12, while the end wall surface 34 is parallel to and concentric with the central longitudinal axis 12.

The annular end cover 19 is positioned in the annular recess 36 and is releasably secured to the carrier ring 18 by a plurality of machine screws 37 extending longitudinally through the annular end cover 19 and the inner annular end wall surface 35 into the body of the carrier ring 18. The annular end cover 19 has an axially outer end wall surface 38, an axially inner wall surface 39, a radially inner generally cylindrical surface 41, and a radially outer generally cylindrical surface 42. The annular end cover 19 is positioned in the annular recess 36 coaxially with the shaft 11 and the carrier ring 18, so that the radially outer surface 42 abuts the annular wall surface 34 and so that the radially inner surface 41 is radially spaced from the exterior surface of the shaft 11 to form an annular clearance gap 43 therebetween. The radial dimension of the annular clearance gap 43 is at least substantially equal to the radial dimension of the annular clearance gap 20 between the shaft 11 and the radially inner generally cylindrical surface 21 of the carrier ring 18, so that the clearance gap 43 is a fluid film sealing clearance between the shaft 11 and the annular end cover 19. In the presently preferred embodiment, the radially inner surface 41 of the annular end cover 19 has a radius which is at least substantially equal to the radius of the radially inner generally cylindrical surface 21 of the carrier ring 18.

An array of longitudinally extending cavities 44 are bored in the carrier ring 18 through the inner annular end wall surface 35, so that each of the cavities 44 has an opening in the inner annular end wall surface 35 and an opening in the radially inner generally cylindrical surface 21. It is preferred that the cavity opening in the inner annular end wall surface 35 not extend into the intermediate annular end wall surface 34 or the outer annular end wall surface 33.

Each cavity 44 has an arcuate cavity wall 45, a first cavity end wall 46, and a second cavity end wall 47. Each first cavity end wall 46 is perpendicular to the central longitudinal axis 12 of the carrier ring 18 and faces toward the second axial end 24 of the carrier ring 18. Each second cavity end wall 47 is actually a respective portion of the axially inner wall surface 39 of the annular end cover 19. Each arcuate cavity wall 45 is a portion of the arcuate surface of a respective hollow cylinder having a longitudinal axis which is parallel to the central longitudinal axis 12, with the longitudinal axis of the respective hollow cylinder being spaced radially outwardly from the radially inner generally cylindrical surface 21 of the carrier ring 18 by a distance less than the radius of the hollow cylinder. Thus, a profile of a cavity 44 in a plane perpendicular to the longitudinal axis 12 of the shaft 11 is a circular segment representing more than fifty percent of the area of the circle. In a presently preferred embodiment, a line tangential to the arcuate cavity wall 45 at the intersection of the arcuate cavity wall 45 with the radially inner generally cylindrical surface 21 is approximately 90° to a line tangential to the radially inner generally cylindrical surface 21 at that same intersection.

In a presently preferred embodiment, at least one first groove 51 is machined into each arcuate cavity wall 45, while at least one second groove 52 is machined in each first cavity end wall 46. In the presently preferred embodiment, each first groove 51 is machined in the portion of the arcuate cavity wall 45 which is furtherest from the central axis 12, and each first groove 51 extends generally longitudinally from a first end 53 adjacent the inner wall surface 39 of the annular end cover 19 to a second end 54 which is a cavity in the respective first cavity end wall 46. Each second groove 52 is machined in a respective first cavity end wall 46 so as to extend generally radially inwardly from the second end 54 of the associated longitudinal groove 51 to a second end 55 located at a predetermined point having a radial distance which is greater than the radius of the radially inner generally cylindrical surface 21. A first groove 51 and the associated second groove 52 combine together to form a roughly L-shaped groove that extends longitudinally along the arcuate cavity wall 45 and then radially inwardly along the first axial cavity end wall 46.

The unitary pivot pad bushing seal bearing 10 also contains a plurality of pivot pads 56, with each pivot pad 56 being disposed in a respective cavity 44. Each pivot pad 56 is configured substantially the same as the respective cavity 44. Thus, a profile of a pad 56 in a plane perpendicular to the longitudinal axis 12 of the shaft 11 is also a circular segment representing more than fifty percent of the area of that circle. The pivot pads 56 have slightly smaller corresponding dimensions than the cavities 44, so that a predetermined radial clearance can be provided between each pivot pad 56 and the arcuate wall 45 of the associated cavity 44 as well as predetermined axial clearances between the ends of each pivot pad 56 and the end walls 46 and 47 of the associated cavity 44. For example, for an integral pivot pad bearing seal bearing 10 for a shaft having 4.5 inches diameter, the radial clearance between the outer arcuate surface 57 of a pivot pad 56 and the arcuate cavity surface 45 would generally be in the range of about 0.0020 inch to about 0.0030 inch. The axial clearance between the pad 56 and the end walls 46 and 47 of the cavity 44 is generally about 0.001 to about 0.003 inch. The tolerances are within limits that can be easily maintained. For example, each of the diameter of the radially outer arcuate pad surface 57, the diameter of the arcuate cavity wall 45, and the diameter of the radially inner surface 21 of the carrier ring 18 can have a tolerance of 0.0005 inch. Each of the pad width and the bore depth of each cavity 34 with respect to the axial face 35 can have a tolerance of 0.001 inch.

Each pivot pad 56 has an outer arcuate surface 57 which is a portion of the arcuate surface of a respective solid cylinder having a longitudinal axis which is parallel to the central axis 12 and having a radius which is only slightly smaller than the radius of the arcuate cavity wall 45, with the longitudinal axis of the arcuate surface 57 being coaxial with the longitudinal axis of the arcuate cavity wall 45. Each pivot pad 56 also has an inner arcuate concave surface 61 which corresponds approximately to the convex curvature of the exterior cylindrical surface of the shaft 11 and is in substantial circumferential alignment with the radially inner generally cylindrical surface 21 of the carrier ring 18. The longitudinal length of the pivot pad 56 is slightly smaller than the longitudinal length of the associated cavity 44. Each of the axial end wall surfaces 58 and 59 of each pivot pad 56 is perpendicular to the central axis 12 of the carrier ring 18, with the axial end wall surface 58 facing the cavity end wall 46 and the axial end wall surface 59 facing the cavity end wall 47 (inner wall 39 of the annular end cover 19).

Each of the pivot pads 56 is provided with a longitudinally extending dowel pin 62, which has one end positioned in a hole 63 in the first axial end 58 of the respective pivot pad 56 and its other end positioned in a hole 64 in the associated first cavity end wall surface 46 in the carrier ring 18. The hole 63 has a diameter which is greater than the diameter of the dowel pin 62 so that the pad 56 can readily move with respect to the dowel pin 62. Each hole 63 is preferably in the form of a slot having a width slightly larger than the diameter of the dowel pin 62 and a length substantially larger than the diameter of the dowel pin 62, with the length of the slot being generally perpendicular to a radius line from the longitudinal axis 12 of the shaft 11 to the center of the length of the slot. Thus, the pivot pad 56 is relatively free to move radially and to pivot about a longitudinal axis which generally coincides with the dowel pin 62. Each dowel pin 62 is located near, but not necessarily at the axis of rotation of the associated pivot pad 56, as the magnitude of the pivoting action of a pivot pad 56 about its axis of rotation is generally less than about 1°. The dowel pin 62 maintains the pivot pad 56 within its associated cavity 44 during assembly operations. Each dowel pin 62 can be located such that it extends through the associated radial groove 52 and then into the carrier ring 18 or such that it extends directly into the first cavity end wall 46. FIGS. 1 and 2 illustrate the dowel pin 62 extending transversely through the radial groove 52 into the carrier ring 18.

The carrier ring 18 is provided with a plurality of fluid feed passageways 67, each of which extends at least generally radially outwardly from a respective longitudinal groove 51 to the radially outer generally cylindrical surface 22 of the carrier ring 18. Thus, fluid from the high pressure chamber 68 passes into the annular gap 17 between the carrier ring 18 and the second casing component 15, then through each passageway 67 into the associated longitudinal groove 51, the clearance gap 72 between the outer arcuate surface 57 of the respective pivot pad 56 and the arcuate surface 45 of the associated cavity 44, and the associated radial groove 52, so that the pressure $P_N$ in the high pressure chamber 68 is transmitted to each longitudinal groove 51 and radial groove 52.

The annular end cover 19 is attached to the inner annular end wall surface 35 of the carrier ring 18 so as to cover the full radial extent of the cavities 44 in the annular end wall surface 35 and to maintain the pivot pads 56 in place within the cavities 44.

While the presently preferred embodiment includes a radially extending fluid feed passageway 67 for each cavity 44, it is possible to furnish the high pressure fluid to the longitudinal grooves 51 by positioning a plurality of passageways in the annular end cover 19 so as to extend generally longitudinally from the axially outer surface 38 of the annular end cover to the respective groove 51. In either situation, the fluid passageways transmit high pressure fluid from chamber 68 to the cavities 44 without the thus transmitted fluid having to go through the annular sealing gap 43, or the gap between cavity end wall 47 and pivot pad end wall 59, or the gap between the cavity end wall 46 and the pivot pad end wall 58, or the gap between the outer arcuate pad surface 57 and the arcuate cavity wall 45.

Thus, while the high pressure fluid in chamber 68 presses the surface 69 of the annular land element 29 against the radial face 71 of the casing component 14, there is no fluid flow path, apart from the fluid passageways 67 and the annular gap 41 between the annular end cover 19 and the shaft 11, for fluid flow from the high pressure chamber 68 through the integral pivot pad bushing seal bearing 10 to the low pressure annular gap 16 between the casing component 14 and the shaft 11. The gap between the shaft 11 and the radially inner surface 21 of the carrier ring 18 and the gap between the shaft 11 and the radially inner surface 41 of the annular end cover 19 are sufficiently small so as to provide a fluid seal against the pressure differential between the high pressure chamber 68 and the low pressure gap 16. The fluid passageways 67 are sufficiently large so as to provide the desired high pressure fluid to the grooves 51, but the axial gaps between each pivot pad end wall and the adjacent cavity end wall are sufficiently small so as to limit the leakage flow rate of the fluid through the passageways 67 and the cavities 44. Thus, the fluid pressure in the longitudinal groove 51 is greater than the average of the fluid pressure exerted radially outwardly against the inner arcuate surface 61 of the pivot pad 56, such that the pivot pad 56 is pressed inwardly toward the shaft 11. Accordingly, there is a pressure drop across the longitudinal length of the radially inner generally cylindrical surface 61 of each pivot pad 56, so that the pivot pads 56 also act as fluid seals for the rotatable shaft 11.

Each of the radially inner generally cylindrical surface 21 of the carrier ring 18, the radially inner surface 61 of the pivot pads 56, and the radially inner surface 41 of the annular end cover 19 is coated with a soft material, such as babbitt metal, which is suitable for rotatively sealing about the shaft 11.

The carrier ring 18 can have circumferential grooves 65 and 66 formed in its radially inner generally cylindrical surface 21 at spaced apart locations along the central axis 12. Each of the circumferential grooves 65 and 66 extends along the radially inner generally cylindrical surface 21 from each cavity 44 to the next adjacent cavity 44. In the presently preferred embodiment, the groove 65 is located adjacent to the pivot pad end walls 58 while the groove 66 is located adjacent to the pivot pad end walls 59. The circumferential grooves 65 and 66 reduce the cross-coupling influences associated with the radially inner generally cylindrical surface 21 of the carrier ring 18.

In operation, the outer annular end wall surface 33 of the carrier ring 18 and the outer surface 38 of the annular end cover 19 are exposed to the pressure $P_N$ in the high pressure chamber 68, and as the pressure $P_N$ is greater than the pressure $P_L$ and the total surface area of the outer annular end wall surface 33 of the carrier ring 18 and the outer surface 38 of the annular end closure 19 is greater than the surface area of the portion of the first end wall 28 which is radially inwardly of the annular land element 29, the unitary pivot pad bushing seal bearing 10 is moved axially toward the first casing component 14 so as to firmly press the end surface 69 of the annular land element 29 against the radially extending surface 71 of the first casing component 14. The shaft 11 rotates inside the carrier ring 18 and the casing components 14 and 15, but the dowel 25 prevents the rotation of the unitary pivot pad bushing seal bearing 10 about the central axis 12.

The high pressure fluid from the high pressure chamber 68 will pass through the annular gap 17 and the fluid passageways 67 into the longitudinal grooves 51 and the radial grooves 52. The fluid pressure in the longitudinal grooves 51 acts against the radially outermost portion of the arcuate surfaces 57 to press the pivot pads 56 radially inwardly toward the external surface of the shaft 11. The fluid pressure in the radial grooves 52 acts against the first axial end 58 of the pivot pads 56 to partially counteract the high pressure fluid acting against the second axial end 59 of the respective pivot pad 56. The high pressure in the longitudinal grooves 51 and in the radial grooves 52 provides positive fluid lubrication between the mating surfaces of the cavity end 46 and the end wall surface of the pivot pad 56. The high pressure also acts to create a hydrostatic fluid film in the clearance 72 between the outer arcuate surface 57 of the respective pivot pad 56 and the arcuate surface 45 of the associated cavity 44. Squeeze film damping action takes place in this clearance 72 when lateral shaft vibration occurs. A hydrodynamic fluid film is also created between the inner arcuate surface 61 of a pivot pad 56 and the external surface of the shaft 11, which imparts direct stiffness and damping to the shaft 11 when the shaft 11 is rotating.

The radius of the inner arcuate surface 61 of each pivot pad 56 can be the same as the radius of the inner arcuate generally cylindrical surface 21 of the carrier ring 18, with each being slightly larger than the radius of the external surface of the adjacent portion of the shaft 11. If desired, the radius of the inner arcuate surface 61 of each pivot pad 56 can be slightly larger than the radius of the inner arcuate generally cylindrical surface 21, so as to produce a small positive pre-load. The radial forces exerted on the outermost surface of the pivot pads 56 can be adjusted by varying the width of the longitudinal grooves 51.

The radial grooves 52 are on the low pressure end of the pivot pads 56, and the fluid pressure in the radial grooves 52 equalizes the axial load which acts against the second axial end 59 of the pivot pads 56. With the pressure balanced axially across the pivot pads 56, the pivot pads 56 are free to float axially. If desired, the transverse width and the radial extent of each radial groove 52 can be selected to produce only a small counteracting axial force on the pivot pads 56 so that the high pressure acting against the second axial end 59 will be larger and press the first end wall surface 58 of the respective pivot pad 56 against the cavity end wall 46 of the associated cavity 44 so as to contribute to a reduction of fluid leakage between the pivot pad end surface 58 and the cavity end wall 46. The longitudinal grooves 51 and the radial grooves 52 can both be milled in the same machine operation.

The radius of each of the radially inner generally cylindrical surface 21 of the carrier ring 18 and the radially inner generally cylindrical surface 41 of the annular end cover 19 is only slightly greater than the radius of the adjacent portion of the rotatable shaft 11 so that the carrier ring 18 and annular end cover 19 serve as a bushing seal for the shaft 12, while the pivot pads 56 serve as floating seals and as bearing supports. For example, typical clearances 20 and 43 for a 4.5 inches diameter shaft would be in the range of about 0.007 inch to about 0.008 inch, while typical pivot pad clearances, with the pads 56 in the fully retracted position, would be in the range of about 0.005 inch to about 0.007 inch. With the pivot pads 56 being incorporated into the otherwise solid carrier ring 18 to provide support for shaft 11, an extremely compact design has been achieved for a unitary pivot pad bushing seal bearing. This design is so compact that it can be installed in units which accommodate only one standard bushing seal, thus making it especially useful in field retrofits.

Reasonable variations and modifications are possible within the scope of the foregoing description, the drawings and the appended claims to the invention. For example, the number of pivot pads 56 can be greater or smaller than the five in the embodiment illustrated in the drawings. The second annular end portion can have a single annular end wall surface, with the outer diameter of the annular end cover 19 being equal to the outer diameter of the carrier ring 18. The longitudinal groove 51 can be in the form of two longitudinal grooves which are symmetrically positioned to the radially outermost longitudinal line in the arcuate cavity wall 45. While the radially outer surfaces of the carrier ring 18 and the end cover 19 are illustrated as being cylindrical surfaces, they can be any suitable configuration. In an embodiment wherein the fluid passages 67, the longitudinal grooves 57 and radial grooves 52 are omitted, there would not be a high pressure fluid behind the pads 56 to press them radially inwardly toward the shaft 11; but there would still be a rotor dynamic benefit from the hydrodynamic oil film between the pads 56 and the rotating shaft 11. While this embodiment does not provide the benefit obtained through the presence of the high pressure fluid passages behind the pads 56, it does provide a simpler design.

I claim:

1. An integral pivot pad bushing seal bearing adapted for providing sealing about and support of an adjacent portion of a rotatable shaft when the rotatable shaft is positioned coaxially therewith, said integral pivot pad bushing seal bearing comprising:

a carrier ring having a central longitudinal axis, a radially inner generally cylindrical surface, a radially outer surface, a first annular end wall, and a second annular end wall; said radially inner generally cylindrical surface having a diameter which is only slightly larger than a diameter of the adjacent portion of said rotatable shaft when said carrier ring is positioned coaxially with and about said rotatable shaft, so as to provide a sealing clearance therebetween;

said carrier ring having a plurality of longitudinally extending cavities formed therein with each of said cavities forming a respective opening in said radially inner generally cylindrical surface, each of said cavities being defined by an arcuate cavity wall and first and second cavity end walls;

a plurality of pivot pads, each pivot pad having a radially outer arcuate pad surface, a radially inner pad surface, and first and second pad ends; each of said pivot pads being positioned in a respective one of said plurality of cavities with its radially outer arcuate pad surface facing the arcuate cavity wall of the associated cavity, each said first pad end facing the first cavity end wall of the associated cavity, and each radially inner pad surface being substantially flush with the radially inner generally cylindrical surface of the carrier ring; each pivot pad being configured substantially the same as the associated cavity, the pivot pads having dimensions such that there is a slight clearance between each pivot pad and the associated arcuate cavity wall to allow creation of a fluid film in that clearance.

2. An integral pivot pad bushing seal bearing in accordance with claim 1, wherein each of said cavities also forms a respective opening in said second annular end wall, so that each pivot pad can be inserted into its associated cavity in a longitudinal direction through the respective opening in said second annular end wall.

3. An integral pivot pad bushing seal bearing in accordance with claim 2, further comprising an annular end cover having an axially inner surface and an axially outer surface, with said annular end cover being secured to said second annular end wall of said carrier ring so that the axially inner surface of said annular end cover forms the second cavity end wall of each of said cavities, whereby said annular end cover retains each pivot pad within its associated cavity.

4. An integral pivot pad bushing seal bearing in accordance with claim 1, further comprising a plurality of dowel pins, each of said dowel pins extending from a respective first cavity end wall into a hole in the pivot pad in the associated cavity, the diameter of the hole being greater than the diameter of the dowel pin.

5. An integral pivot pad bushing seal bearing in accordance with claim 1, wherein said cavities are equally spaced about the circumference of the radially inner generally cylindrical surface.

6. An integral pivot pad bushing seal bearing in accordance with claim 1, wherein each arcuate cavity wall is a portion of an arcuate surface of a respective first cylinder having a longitudinal axis which is parallel to the central longitudinal axis, with the longitudinal axis of the respective first cylinder being spaced radially, with respect to the central longitudinal axis, outwardly from the radially inner generally cylindrical surface of the carrier ring by a distance less than the radius of the respective first cylinder.

7. An integral pivot pad bushing seal bearing in accordance with claim 6, wherein each radially outer arcuate pad surface is a portion of an arcuate surface of a respective second cylinder having a longitudinal axis which is parallel to the central longitudinal axis, with the radius of the second cylinder being slightly smaller than the radius of the first cylinder to provide the slight clearance between each radially outer arcuate pad surface and the associated arcuate cavity wall to allow creation of a fluid film in that clearance.

8. An integral pivot pad bushing seal bearing adapted for providing sealing about and support of an adjacent portion of a rotatable shaft when the rotatable shaft is positioned coaxially therewith, said integral pivot pad bushing seal bearing comprising:

a carrier ring having a central longitudinal axis, a radially inner generally cylindrical surface, a radially outer surface, a first annular end wall, and a second annular end wall; said radially inner generally cylindrical surface having a diameter which is only slightly larger than a diameter of the adjacent portion of said rotatable shaft when said carrier ring is positioned coaxially with and about said rotatable shaft, so as to provide a sealing clearance therebetween;

said carrier ring having a plurality of longitudinally extending cavities formed therein with each of said cavities forming a respective opening in said radially inner generally cylindrical surface, each of said cavities being defined by an arcuate cavity wall and first and second cavity end walls;

a plurality of pivot pads, each pivot pad having a radially outer arcuate pad surface, a radially inner pad surface, and first and second pad ends; each of said pivot pads being positioned in a respective one of said plurality of cavities with its radially outer arcuate pad surface facing the arcuate cavity wall of the associated cavity, each said first pad end facing the first cavity end wall of the associated cavity, and each radially inner pad surface being substantially flush with the radially inner generally cylindrical surface of the carrier ring; the pivot pads having dimensions such that there is a slight clearance between each pivot pad and the associated arcuate cavity wall to allow creation of a fluid film in that clearance;

said carrier ring having at least one fluid passageway formed therein so as to extend from an exterior surface of the carrier ring to the clearance between each pivot pad and the associated arcuate cavity wall so that high pressure fluid can be supplied to act against the outer arcuate pad surface of the respective pivot pad to press the respective pivot pad toward the rotatable shaft.

9. An integral pivot pad bushing seal bearing in accordance with claim 8, wherein each of said arcuate cavity walls has a longitudinal axis which is at least generally parallel to said central longitudinal axis, wherein each of said arcuate cavity walls has a first groove formed therein which extends at least generally longitudinally, and wherein said at least one fluid passageway provides fluid communication between each first groove and an exterior surface of said carrier ring.

10. An integral pivot pad bushing seal bearing in accordance with claim 9, wherein each of said first cavity end walls has a second groove formed therein which extends at least generally radially and is in fluid communication with the first groove of the respective cavity.

11. An integral pivot pad bushing seal bearing in accordance with claim 9, wherein each first groove extends at least substantially along a longitudinal length of the associated cavity, and is located in a portion of the associated cavity having a substantially maximum radial distance from said central longitudinal axis.

12. An integral pivot pad bushing seal bearing in accordance with claim 8, wherein each of said cavities also forms a respective opening in said second annular end wall, so that each pivot pad can be inserted into its associated cavity in a longitudinal direction through the respective opening in said second annular end wall.

13. An integral pivot pad bushing seal bearing in accordance with claim 12, further comprising an annular end cover having an axially inner surface and an axially outer surface, with said annular end cover being secured to said second annular end wall of said carrier ring so that the axially inner surface of said annular end cover forms the second cavity end wall of each of said cavities, whereby said annular end cover retains each pivot pad within its associated cavity.

14. An integral pivot pad bushing seal bearing in accordance with claim 13, further comprising a plurality of dowel pins, each of said dowel pins extending from a respective first cavity end wall into a hole in the pivot pad in the associated cavity, the diameter of the hole being greater than the diameter of the dowel pin.

15. An integral pivot pad bushing seal bearing in accordance with claim 14, wherein said cavities are equally spaced about the circumference of the radially inner generally cylindrical surface.

16. An integral pivot pad bushing seal bearing in accordance with claim 8, wherein each arcuate cavity wall is a portion of an arcuate surface of a respective first cylinder having a longitudinal axis which is parallel to the central longitudinal axis, with the longitudinal axis of the respective first cylinder being spaced radially, with respect to the central longitudinal axis, outwardly from the radially inner generally cylindrical surface of the carrier ring by a distance less than the radius of the respective first cylinder.

17. An integral pivot pad bushing seal bearing in accordance with claim 16, wherein each radially outer arcuate pad surface is a portion of an arcuate surface of a respective second cylinder having a longitudinal axis which is parallel to the central longitudinal axis, with the radius of the second cylinder being slightly smaller than the radius of the first cylinder to provide the slight clearance between each radially outer arcuate pad surface and the associated arcuate cavity wall to allow creation of a fluid film in that clearance.

18. An integral pivot pad bushing seal bearing in accordance with claim 17, wherein each cavity end wall is generally perpendicular to said central longitudinal axis.

19. An integral pivot pad bushing seal bearing in accordance with claim 18, wherein each pivot pad has a longitudinal length which is slightly smaller than a longitudinal length of the associated cavity so that there is a slight clearance between each pivot pad end and the axially adjacent cavity end wall to allow creation of a fluid film in that clearance.

20. An integral pivot pad bushing seal bearing in accordance with claim 19, wherein each of said arcuate cavity walls has a longitudinal axis which is at least generally parallel to said central longitudinal axis, wherein each of said arcuate cavity walls has a first groove formed therein which extends at least generally longitudinally, and wherein said at least one passageway provides fluid communication between each first groove and an exterior surface of said carrier ring.

21. An integral pivot pad bushing seal bearing in accordance with claim 20, wherein each of said first cavity end walls has a second groove formed therein which extends at least generally radially and is in fluid communication with the first groove of the respective cavity.

22. An integral pivot pad bushing seal bearing in accordance with claim 20, wherein each first groove extends at least substantially along a longitudinal length of the associated cavity, and is located in a portion of the associated cavity having a substantially maximum radial distance from said central longitudinal axis.

23. An integral pivot pad bushing seal bearing in accordance with claim 8, wherein said first annular end wall of said carrier ring is adapted to seal against a casing containing the rotatable shaft, so that the only fluid flow path past said carrier ring is through the sealing clearance between said radially inner generally cylindrical surface of said carrier ring and the external surface of the rotatable shaft.

24. An integral pivot pad bushing seal bearing in accordance with claim 8, further comprising a plurality of dowel pins, each of said dowel pins extending from a respective first cavity end wall into a hole in the pivot pad in the associated cavity, the diameter of the hole being greater than the diameter of the dowel pin.

25. An integral pivot pad bushing seal bearing in accordance with claim 8, wherein said cavities are equally spaced apart about the circumference of the radially inner generally cylindrical surface.

26. An integral pivot pad bushing seal bearing in accordance with claim 8, wherein each arcuate cavity wall is a portion of an arcuate surface of a respective hollow cylinder having a longitudinal axis which is parallel to the central longitudinal axis, with the longitudinal axis of the respective hollow cylinder being spaced radially, with respect to the central longitudinal axis, outwardly from the radially inner generally cylindrical surface of the carrier ring by a distance less than the radius of the respective hollow cylinder.

27. An integral pivot pad bushing seal bearing in accordance with claim 26, wherein each radially outer arcuate pad surface is a portion of an arcuate surface of a respective solid cylinder having a longitudinal axis which is parallel to the central longitudinal axis, with the radius of the solid cylinder being slightly smaller than the radius of the hollow cylinder to thereby provide said slight clearance between each radially outer arcuate pad surface and the associated arcuate cavity wall and allow creation of a fluid film in that clearance.

28. An integral pivot pad bushing seal bearing in accordance with claim 8, wherein each pivot pad has a longitudinal length which is slightly smaller than a longitudinal length of the associated cavity so that there is a slight clearance between each pivot pad end and the axially adjacent cavity end wall to allow creation of a fluid film in that clearance.

* * * * *